(12) United States Patent
Rieger

(10) Patent No.: US 6,555,643 B1
(45) Date of Patent: Apr. 29, 2003

(54) LINEAR, ISOTACTIC POLYMERS, PROCESS FOR PREPARING SAME, AND USE THEREOF

(76) Inventor: Bernhard Rieger, Johann-Stockar-Weg 50, 89075 Ulm (DE)

( * ) Notice: Subject to any disclaimer, the term of this patent is extended or adjusted under 35 U.S.C. 154(b) by 0 days.

(21) Appl. No.: 09/673,282

(22) PCT Filed: Apr. 8, 1999

(86) PCT No.: PCT/EP99/02379

§ 371 (c)(1),
(2), (4) Date: Oct. 19, 2000

(87) PCT Pub. No.: WO99/52955

PCT Pub. Date: Oct. 21, 1999

(30) Foreign Application Priority Data

Apr. 9, 1998 (DE) ......................................... 198 16 154

(51) Int. Cl.⁷ ................................................ C08F 10/06
(52) U.S. Cl. .................... 526/351; 526/348; 526/348.2; 526/348.3
(58) Field of Search ................................ 526/160, 165, 526/348, 351, 943, 348.3, 348.2

(56) References Cited

U.S. PATENT DOCUMENTS 5,747,621 A * 5/1998 Resconi et al.

FOREIGN PATENT DOCUMENTS

| DE | 28 30 160 A1 | 1/1979 |
|---|---|---|
| DE | 197 09 486 A1 | 9/1998 |
| EP | 0 582 194 B1 | 2/1994 |
| EP | 0 707 016 A1 | 4/1996 |
| EP | 0 747 406 A1 | 12/1996 |
| GB | 2 241 244 A | 8/1991 |
| WO | PCT/EP95/05016 | 4/1996 |
| WO | PCT/US98/22028 | 4/1999 |

OTHER PUBLICATIONS

Dietrich et al., "New Class of Thermoplastic Elastic Polypropenes Prepared with a High Activity 'Dual Side' Zirconocene Catalyst," *RAPRA Abstract*, 36 (1) (Jan., 1999).

Dietrich et al., "Control of Stereoerror Formation with High–Activity 'Dual–Side' Zirconocene Catalysts: A Novel Strategy to Design the Properties of Thermoplastic Elastic Polypropenes," *J. Am. Chem. Soc.*, 121 (18), 4348–4355 (1999).

Rieger et al., "Novel Metallocene Catalyzed Polypropene Homo– and Brush–Copolymers: Control of New Morphologies and Beyond," *Polym. Mater. Sci. Eng.*, 80, 51–52 (1999).

Rieger, B. "Stereospecific Propene Polymerization with rac-[1,2-bis($\eta^5$-(9-fluorenyl))-1-phenylethane]zirconium dichloride/methylalumoxane," *Polymer Bulletin*, 32 (1), 41–46 (Jan. 1994).

Search Report for Application No. DE 198 16 154 A1 dated Oct. 21, 1999.

Search Report for Application No. PCT/EP99/02379 dated Sep. 17, 1999.

Keii et al. *Catalytic Defin Polymerization*, Tokyo: Kodanska Elsevier Pub., pp. 439–480, (1990).

* cited by examiner

*Primary Examiner*—Caixia Lu
*Assistant Examiner*—Amy P Perkins
(74) *Attorney, Agent, or Firm*—Leydig Voit & Mayer, Ltd.

(57) ABSTRACT

The invention refers to a linear, isotactic polymer which has a structure of one or several $C_2$ to $C_{20}$ olefins, of which the isotacticity due to a statistic distribution of stereoscopic errors in the polymer chain, is within the range of from 25 to 60% of [mmmm] pentad concentration, the polymer having a mean molecular weight Mw within the range of from 100,000 to 800,000 g/mol and a Tg of from −50 to 30° C.

13 Claims, 4 Drawing Sheets

US 6,555,643 B1

LINEAR, ISOTACTIC POLYMERS, PROCESS FOR PREPARING SAME, AND USE THEREOF

FIELD OF THE INVENTION

The present invention relates to linear, isotactic polymers, to a process for preparing same, and to the use thereof, isotacticity of the linear polymers, due to a statistic distribution of stereoscopic errors in the polymer chain, being within the range of from 25 to 60% of [mmmm] pentad concentration.

BACKGROUND OF THE INVENTION

For a long time, isotactic polymers have been of interest as plastic materials for manufacturing articles of relatively good deformation resistance, such as sheathings of household appliances. In general, such isotactic polymers with propylene as monomer are of highly crystalline nature and, therefore, are relatively hard with little or no impact resistance such that they are useful only in applications in which hardness or low impact resistance is desirable.

Most recently, various attempts have been made, aiming at preparing also polypropylene with elastic characteristics. EP 0 707 016 A1 specifies a catalyst composition and a process for preparing polyolefins. The catalysts specified in EP 0 707 016 A1 are, in substance, made up of a metallocene compound having an indene ring and a fluorene ring which are bridged via C, Si or Ge. In case of the metallocene compound, it is essential that, in the indene ring system, at least the residue denoted with $R^4$ not be hydrogen. When that residue $R^4$ is hydrogen, the effects will not be attained. The polymers specified in EP 0 707 016 A1 prepared with metallocenes, especially the polypropylene prepared with those metallocenes, however, have shown unsatisfactory characteristics in regard of the elastic behavior.

BRIEF SUMMARY OF THE INVENTION

It is the object of the present invention to make polymers from olefinically unsaturated compounds which have not only thermoplastic characteristics but also thermoplastic-elastic characteristics, thus making the polymers useful for many applications. It is a further object of the present invention to suggest a process suitable for preparing the polymers and the use thereof.

According to the invention, linear, thermoplastic, elastic polymers from an olefinically unsaturated compound with an isotactic arrangement of the monomer units and a statistic distribution of isolated stereoscopic errors along the individual chains and a mean molecular weight Mw of the polymers within the range of from 100,000 to 800,000 g/mol and a Tg of from −50 to +30° C., thus, are suggested.

DETAILED DESCRIPTION OF THE INVENTION

Figure 1:
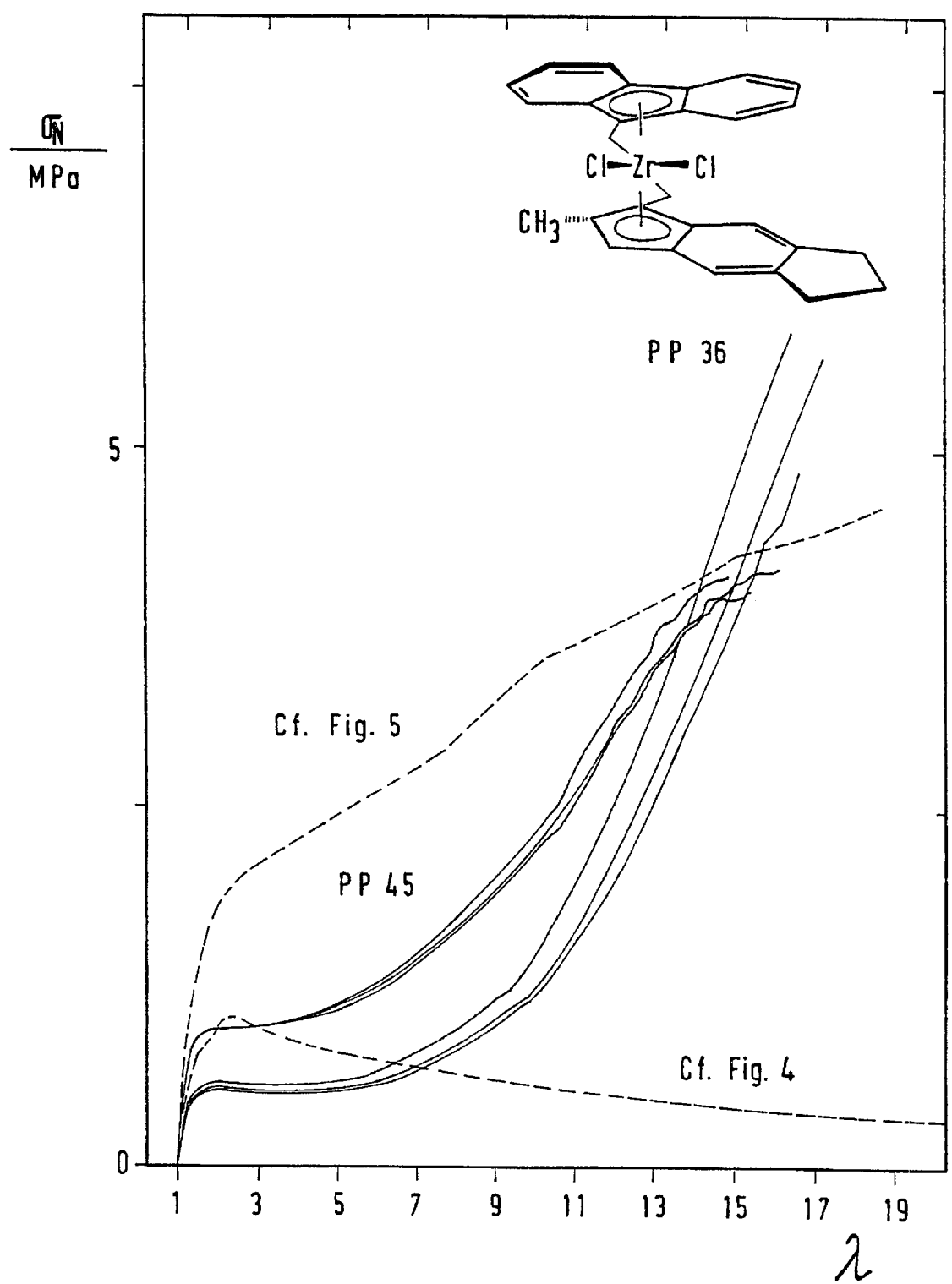
FIG. 1. illustrates tensile-strength measurements on two polymers according to the invention, as compared to two polymers from EP 0 707 016 A1.
Figure 2:
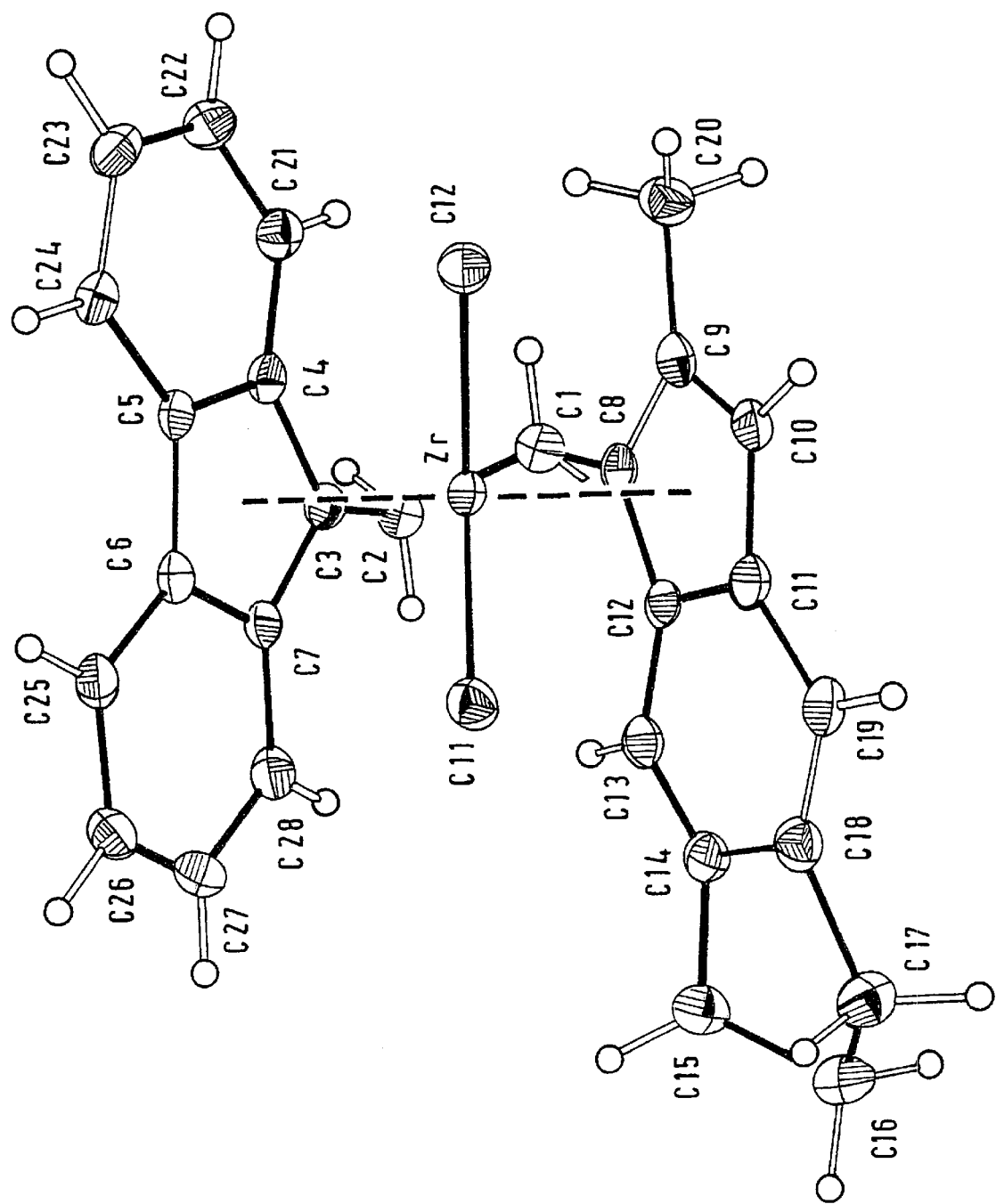
FIG. 2. illustrates an x-ray structure analysis of a metallocene complex according to the invention.
Figure 3:
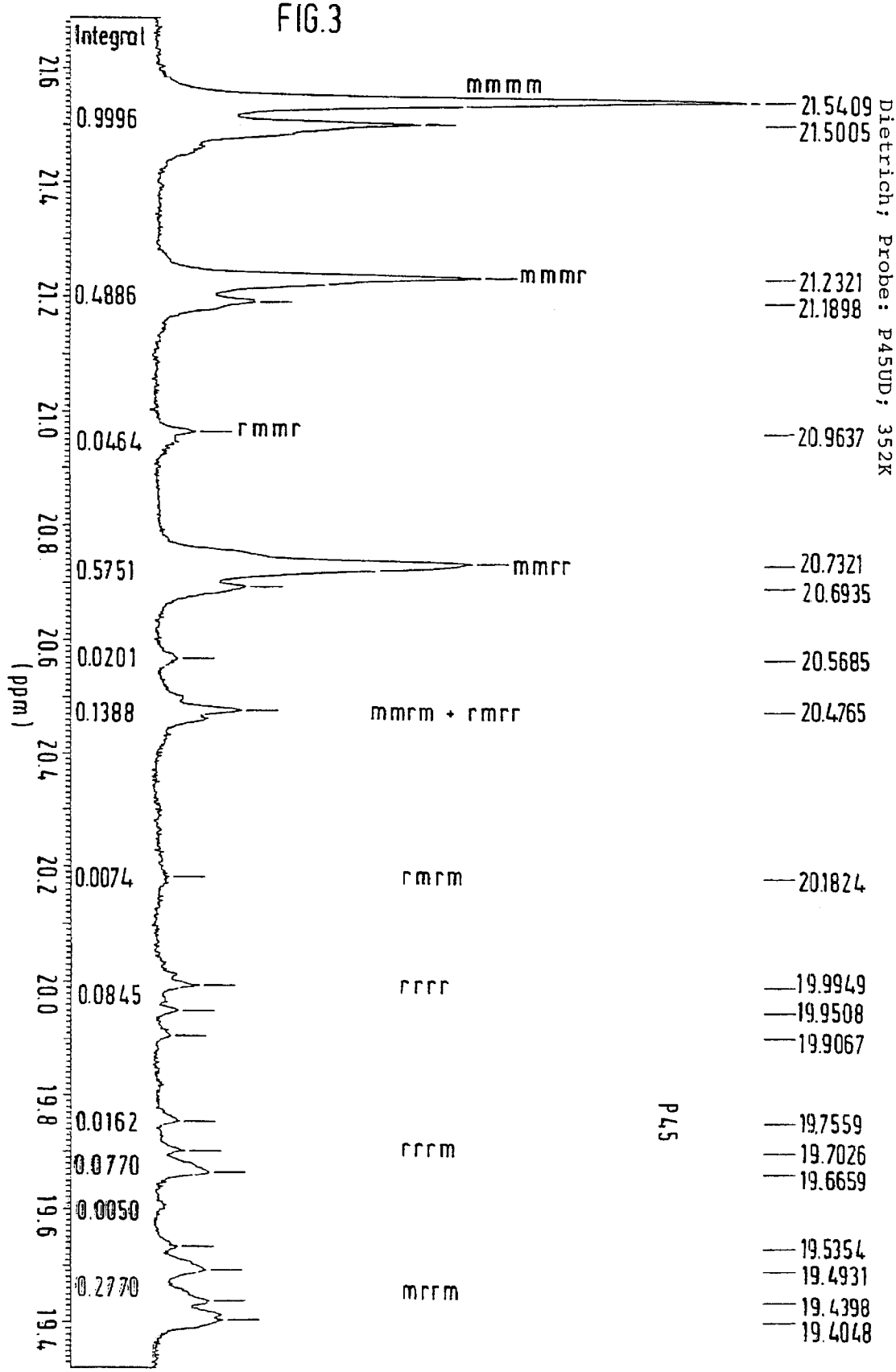
FIG. 3. illustrates a nuclear magnetic resonance (NMR) spectrum of a polymer according to the invention.

With the polymer according to the invention, it is essential that the stereoscopic errors be situated in the polymer chain itself such that a specific pentad concentration results. Accordingly, it was found that, with the polymers according to the invention, the [rmrm] pentad with a maximum of 2.5% of the entire pentad area will, in general, be present. In many cases, it was also found that [rmrm] pentad was completely missing.

The concentration of [rrrr] and [rrrm] pentads in the polymer according to the invention are generally greater than the concentration of [rmrm] pentad. Determination of the pentad concentration in case of polymers has, properly speaking, become known from the state-of-the-art and is specified e.g. in J. A. Ewen, "Catalytic Polymerisation of Olefins", Eds. T. Keii, K. Soga; Kodanska Elsevier Pub.; Tokyo, 1986, P 271 et seqq. The method specified in the Ewan reference was used to determine the pentad concentration for the polymers of the invention The linear, isotactic polymers according to the invention generally have a molecular weight within the range of from 100,000 to 800,000 g/mol, preferably from 110,000 to 500,000 g/mol, and more preferably within the range of from 120,000 to 300,000 g/mol. The mean molecular weights Mw (mean weight value) of the polymers according to the invention were measured by means of the gel permeation chromatography (GPC) method at 135° C. with microstyragel as column material and 1,2,4-trichlorobenzene as solvent against closely distributed polypropylene standards. The molecular weight distribution Mw/Mn (mean weight value/ mean numerical value) of the polymers according to the invention was likewise measured by means of the gel permeation chromatography method and generally amounts to from 1.2 to 3.5.

The polymers according to the invention generally show a glass transition temperature Tg within the range of from −50° C. to +30° C., preferably within the age of from −20° C. to +10° C. The glass transition temperate was determined by means of the DSC method.

The linear, isotactic polymers according to the invention have a structure comprising of one or several $C_2$–$C_{20}$ olefins. Preferably, the olefin is a $C_3$–$C_{20}$ alk-1-ene such as propene, 1-butene, 2butene, 1-pentene, 1-hexene, 1-octene, 1-nonene, 1-decene, 1-dodecene, 1-hexadecene, 1-octadecene, and 1-eicosene or a $C_5$–$C_{20}$ cycloolefin, for example, cyclopentene, cyclohexene, norbornadiene and its derivatives.

Of the linear, isotactic polymers according to the invention, polypropylene is especially preferred. Also preferred polymers are copolymers prepared from propylene and a $C_4$–$C_{20}$ olefin or a cycloolefin. Terpolymers may also show the characteristics of the invention when they have a structure comprising propylene, a $C_2$–$C_{20}$ olefin and a cycloolefin.

The polymers according to the invention are, for example, soluble in toluene at a temperature within the range of from 20 to 80° C. In addition, the polymers demonstrate a distinct elastic behavior in a tensile-strength test, measured with a "Standard Universal Testing Machine ZWICK 1445", as specified in the examples, and, in general, possess a crystallization melting temperature, measured by means of the "Differential Scanning Calometry" (DSC) method within the range of from −50° C. to 150° C. The polymers according to the invention, clearly differ, in regard of their elastic-thermoplastic behavior, from the state-of-the-art, i.e. from EP 0 707 016 A1. This being so, the polymers according to the invention are particularly suited for the manufacture of articles of relatively good deformation resistance, such as sheathings for household appliances. Furthermore, it is worth mentioning that the polymers can be used in polymer mixtures for impact resistance modification. Due to their elastic characteristics, the polymers are especially suited for elastic sheets, molded bodies, and gaskets.

The invention further relates to a process for preparing liner, thermoplastic-elastic polymers from olefinically unsaturated compounds, wherein the polymers have an isotactic arrangement of the monomer unit and a statistic distribution of isolated stereoscopic errors along the individual chains, as well as a tacticity varying with the range of between 25 and 60% [mmmm] pentad concentration. A regular sequence of isotactic and atactic blocks, therewith, is excluded. In many cases, it was found that the [rmrm] pentad was totally missing or present with a maximum of 2.5% of the entire pentad area. Furthermore, it became evident that, in most cases, the [rrrr] and [rrrm] pentad concentrations are always greater than the [rmrm] pentad concentration. The process according to the invention is specifically characterized in that a specially selected catalyst composition is used, containing, on the one hand, a specific, exactly defined metal complex and, on the other hand, an activator.

The metal complex is a metallocene compound, for example, a metallocene containing a metal selected from Group IVB of the Periodic Table. The metallocene compounds may be present as defined metal complexes mixed with activators. In general, the metals present in the complexes have a formally positive charge. Specifically, the metal can be titanium, zirconium, hafnium, vanadium, niobium, or tantalum. Preferably, the metal is substituted by a halogen or a $C_1$–$C_5$ alkyl, aryl, or benzyl group.

The metallocene compound which is suited for preparing the linear, isotactic polymers is defined by general Formula I:

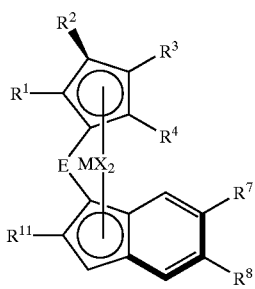

(I)

wherein $R^1$, $R^2$, $R^3$, $R^4$, $R^6$, and $R^7$ are a linear or branched $C^1$–$C_{10}$ alkyl, a $C_{5-7}$ cycloalkyl that; in its turn, may carry one or several $C_1$–$C_6$ alkyl residues as substituents, a $C_6$–$C_{18}$ aryl, aryl alkyl or alkyl aryl, in which case $R^1$, $R^2$, $R^3$, $R^4$, and $R^6$, $R^7$, here again, may be partially or simultaneously integrated into $C_{5-7}$ cycloalkyl or aryl rings fused thereto.

In case of the metallocene compound according to general Formula I, it is essential that the number 7 indenyl carbon adjacent to the carbon substituted by residue $R^7$ and the number 4 indenyl carbon adjacent to the carbon substituted by residue $R^6$ are only substituted by hydrogen, thereby providing a catalyst that is especially advantageous for preparing isotactic elastomers according to the invention. In contrast, the metallocene complex according to EP 0 707 016 A1 does not have such limitations.

Suitable bridging structural units E are —$CH_2CH_2$—, —$CH_2CH_2CH_2$—, —$CH_2CH_2CH_2CH_2$—, —$CR^9R^{10}$—, —$SiR^9R^{10}$—, or —$GeR^9R^{10}$—, wherein $R^9$ and $R^{10}$ are a $C_1$–$C_8$ alkyl, a $C_{4-7}$ cycloalkyl or aryl, and $R^9$ and $R^{10}$ are able to join together to form a ring structure.

A particularly preferred embodiment of the invention resides in that such a metallocene complex is used as reflected by general Formula VII.

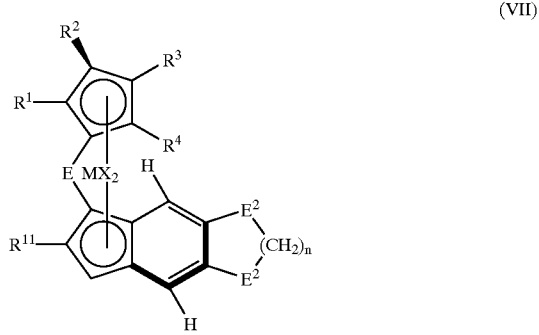

(VII)

wherein all the residues have the definitions indicated above. In contrast to the metallocene complex according to general Formula I, it is imperative that another ring is fused to the indene ring system. The additional fused ring is bridged via two $E^2$ groups, wherein $E^2$ is $CH_2$, oxygen, or sulfur, and n is 1 or 2.

It is furthermore provided in accordance with the invention, to additionally use at least one activator, apart from the metallocene compounds specified above. The invention, herewith, generally encompasses all the activators that have as yet become known in the state-of-the-art for metallocene compounds. Such activators have also been specified by EP 0 707 016 A1. As activator, at least one compound of general Formulas II to VI preferably is used. Accordingly, the activator may be an open-chain or cyclic alumoxane compound of general Formula II or III.

(II)

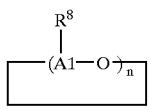
(III)

wherein $R^8$ is a $C_1$–$C_4$ alkyl group and n is a number between 5 and 30.

The catalyst composition according to the invention and optionally the above-specified compounds of general Formulas II and III can be used alone or in combination with the subsequent activators of general Formulas IV to VI:

$$B(C_6F_5)_3 \quad (IV)$$
$$R^9{}_3 C[B(C_6F_5)_4] \quad (V)$$
$$[R^9{}_3 NH][B(C_6F_5)_4] \quad (VI)$$

wherein $R^9$ is a $C_1$–$C_4$ alkyl group or an aryl group.

It has proven to be especially favorable to employ the metallocene complex according to general Formula I and the activator according to general Formulas II to VI in such quantities that the atomic ratio between aluminum from the alumoxane or boron from the activator and the transition metal from the metallocene complex is within the range of from 1:1 to $10^6$:1.

Pressures of from 1 to 100 bars, preferably of from 3 to 20 bars and in particular of from 5 to 15 bars, have proven to be suitable reaction parameters for preparing the linear, thermoplastic, elastomeric olefin polymers. Favorable temperatures are within the range of from −50° C. to 200° C., preferably from 100 to 150° C. and more preferably from 20 to 50° C.

The polymerization reactions can be carried out in the gas phase, in suspension, and in supercritical monomers, and especially in solvents which are inert under the polymerization conditions. In particular the solution polymerization has proven to be superior for the present preparation process. Suitable inert solvents for that purpose are such solvents that do not contain any reactive groups in the molecule, i.e. aromatic solvents like benzene, toluene, xylene, ethyl benzene or alkanes such as propane, n-butane, i-butane, pentane, hexane, heptane or mixtures thereof The polymers according to the invention are particularly suited for the making of fibers, sheets, and molded bodies and are highly suited for such applications that make impact resistance a precondition. The polymers according to the invention can, furthermore, be utilized as blend components in plastic materials, especially in impact resistant plastic materials.

The present invention will, hereinafter, be explained in more detail on the basis of several preparation examples of the catalysts and on the basis of polymerization examples.

EXAMPLES

Figure 4:
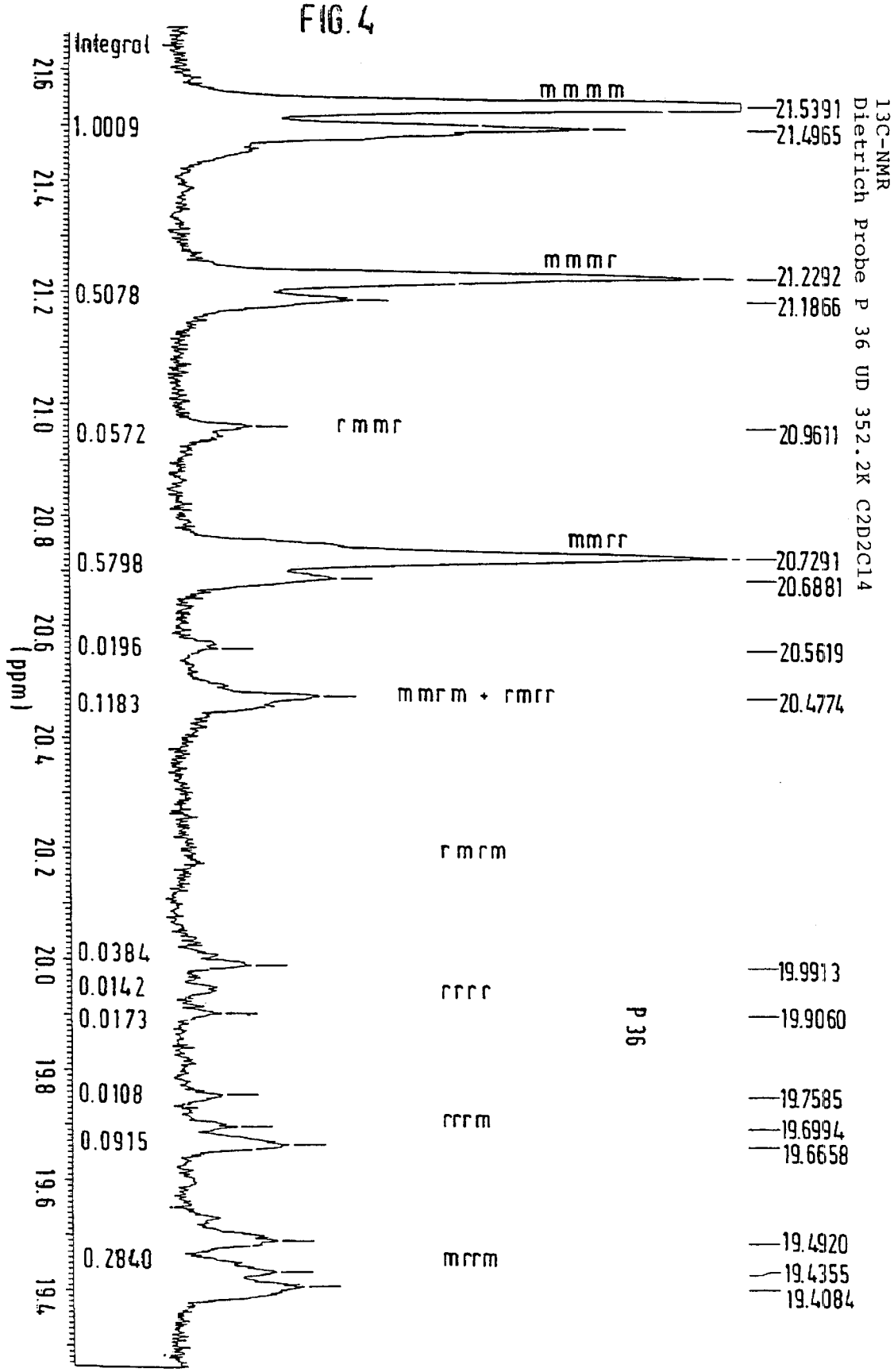
FIG. 4. illustrates a nuclear magnetic resonance (NMR) spectrum of another polymer according to the invention.

FIG. 1 illustrates the tensile-strength measurements of two selected examples from EP 0 707 016 A1, as compared to two polymers prepared in accordance with the invention. The remarks "Cf FIG. 4" and "Cf. FIG. 5" in FIG. 1 refer to the corresponding examples from EP 0 707 016 A1. As can be drawn from a comparison of the comparative tensile-strength curves with the tensile-strength curves of the polymers (PP 36 and PP 45) prepared according to the invention, the polymers according to the invention show a distinctive, rubber-elastic plateau. Contrary thereto, the polymers according to EP 0 707 016 A1 present either a flow behavior (Cf. FIG. 4) or the polymer breaks in case of higher expenditures of force (Cf FIG. 5). This comparison clearly illustrates the surprising characteristics of the polymers prepared according to the invention which have a distinctive, rubber-elastic behavior.

Catalyst Preparation

Obtaining of 5,6-Cyclopenta-2-methyl-indane1-one 40.4 mL of methacryl acid chloride (387.9 mmols) are, together with 62.06 g of anhydrous aluminium chloride (20 mol % in excess), incorporated into 250 mL of $CH_2Cl_2$, cooled down to −78° C., and slowly mixed with 50.0 mL of indane (45.84 g, 387.9 mmols). As the indane is added, the color changes from bright yellow to orange. The mixture is carefully quenched with diluted HCl*aq, washed with hydrous $K_2CO_3$ solution and water, and dried through $Na_2SO_4$.

Yield: 70.07 g (376.2 mmols) of oily product, 97.0% of the theory NMR (200 mcps, $CDCl_3$ 7.24 ppm): δ 1.25 ppm d (J=6.9 cps) 3H methyl group, δ 2.10 ppm m (J=3.7 to 7.6 cps) 2H aliphatic protons of the cycles, δ 2.62 ppm m 2H aliphatic protons of the indanone ring, δ 2.86 ppm m (J=11 to 14 cps) 4H aliphatic protons of the cycles, δ 3.25 ppm m (J=7.0 cps) 1H aliphatic proton of the indanone system, δ 7.21 and 7.51 ppm s 2H aromatic MS (GC-MS) m/z 186 (M+100%), (186, 251 mol−1).

Obtaining of 5,6-Cyclopenta-2methylindane-1-ole 70.07 g (376.2 mmols) of the 2-methyl-5,6-cyclopentylindane-1-one are, with 5 g of $LiAlH_4$, reduced in 200 mL of $Et_2O$ by letting the ketone drip (2 hrs) slowly towards an ice-cooled suspension of $LiAlH_4$. Agitating is effected all through the night and quenching with $H_2O$ is carried out, the color of the solution changing from lime green to bright yellow. Now 15 mL of HCl are added in concentrated manner and the emulsion is agitated for 1 h. The ethereal phase is separated, neutralized with 200 mL of $K_2CO_3$ solution, and three times washed with water. Thereafter, drying is effected through $Na_2SO_4$ and the solvent is completely removed. A crystalline mixture of the diastereomeric 1-indanoles is obtained. NMR (200 mcps, $CDCl_3$); δ 1.13 ppm D 3H methyl group, δ 1,76 ppm wide 1H OH group, δ 2.05 ppm m 2H aliphatic protons of the cycles, δ 2.15 to 2.71 ppm m 2H aliphatic protons of the indanole ring, δ 2.87 ppm m 4H aliphatic protons of the cycles, δ 3.08 ppm 1H aliphatic proton of the indanole system, δ 4.17 and 4.93 ppm d 2H with OH function on the indanole ring, δ 7.08 and 7.23 ppm d 2H aromatic.

Yield: 69.62 g, 369.8 mmols, 98.3% of the theory MS (GC-MS) m/z 188 (M+100%), (188267 g mol$^{-1}$).

Obtaining of 5,6-Cyclopenta-2-methylindene 69.62 g (369.8 mmols) of the diastereomer mixture of the 2-methyl-5,6-cyclopentylindene-1-oles are dissolved in 500 mL of benzene; and then 3 to 5 g of p-TosOH are added and the emulsion is, for three quarters of an hour, boiled on the water separator under reflux. The organic phase is separated, neutralized with 200 mL of $K_2CO_3$ solution, and three times washed with water. Thereafter, drying is effected through $Na_2SO_4$ and the solvent is completely removed.

The product colorlessly crystallizes from n-pentane; yield: 57.67 g, 338.7 mmols corresponding to 91.6% of the theory MS (GC-MS) m/z 170 (M+100%), (170.225 g mol⁻¹). NMR (200 mcps, CDCl₃ 7.24 ppm): δ 2.23 ppm m/s 5H methylene and 2-methyl group of the indene system, δ 3.01 ppm t 4H methylene groups, δ 3.32 ppm s 2H methylene group acids, δ 6.51 ppm s 1H olefinic indene system, δ 7.20 and 7,34 ppm s 2H aromatic, 13-NMR (200 mcps, CDCl₃): δ 16.8 ppm methyl group, δ 25.8 ppm methylene group of Cycle 5, δ 32.66 and 32.72 ppm methylene groups of the Cycle, δ 42.2 ppm methylene group of the indene system, δ 127.1 ppm tertiary C-atom of the indene system, δ 115.5 and 119.5 (each with H) ppm aromatic C-atoms, the same without H for 139.6, 141.7, 142.1, 144.4, and 145.0 ppm incl 4° olefinic C-atom of the indene system (cf. CH correlation and HH-COSY).

Obtaining of 1-(9-Fluorenyl)-2-(1-(1-(5,6cyclopenta-2-methyl) indenyl)ethane 3.89 g of 2-methyl-5,6-cyclopentylindene-1 (22.85 mmols) are, with 14.3 mL of n-BuLi, deprotonated in 150 mL of dioxane and then mixed with a solution of 25.13 mmols of 2-(9'-fluorenyl)ethyltrifluoromethane sulphonate in 100 mL of dioxane. Agitating is effected all through the night, heating up to 60° C. is carried out for half an hour and the solution is quenched with ca. 3 mL of H₂O. The dioxane is removed and the product is extracted with three times 200 mL of Et₂O. Without chromatographic processing, 6,49 g (17.9 mmols, 78.3% of the theory) of a colorless, crystalline product are obtained.

NMR (200 mcps, CDCl3, 7.24 ppm): δ 1.89 ppm s 3H methyl group, δ 1.41 ppm to 1.72 ppm m 4H aliphatic protons of the bridge, δ 2.10 ppm pseudo-t 2H aliphatic protons of the cycle, δ 2.90 ppm pseudo-t 4H aliphatic protons of the cycle, δ 3.87 ppm t 1H aliphatic proton of the fluorine system, δ 6.40 ppm s 1H indene proton, δ 6.98 and 7.07 ppm aromatic protons of the indene system, δ 7.31 to 7.77 ppm m 8H aromatic of the fluorine. MS (FD) m/z 362.5 (M+100%).

Obtaining of 1-(9-Fluorenyl)-2-(5,6-cyclopenta-2-methyl) indenyl)ethane Zirconocene Dichloride 1.711 g of 1-[1'-(2'-methyl)-5',6'-cyclopentylindenyl-2-(9"-fluorenyl)]ethane (4.72 mmols) are dissolved in 100 mL of toluene, mixed with 10 mL of dioxane, and deprotonated, at low temperature, with 5.9 mL of n-BuLi. Agitating is effected for ca. 1 hour and then the suspension is again cooled down to −78° C. Now 1.10 gm of ZrCl₄ is added. That suspension is agitated, at room temperature, for another 14 hours, in which case a fine red powder forms that can be crystallized after a separation of formed LiCl from toluene.

Yield: 2.148 g (4.11 mmols, 87.1% of the theory). NMR (500 mcps, C₂D₂Cl₄ 80° C.); δ 2.00 ppm m 2H methylene group cyclopentane ring (J=6.8 to 7.5 cps), δ 2.15 ppm s 3H methyl group, δ 2.79 to 2.94 ppm m 4H methylene groups cyclopentane ring adjacent to the aromatic system (J=7.5 to 9.7 cps), δ 4.05 ppm m (J=3.5 to 13.2 cps) 2H aliphatic protons of the bridge (in case of the fluorine), δ 3.83 and 4.57 ppm m (J=4.2 to 10.0 cps) 1H aliphatic protons of the bridge (diastereotopic) at a time, δ 6.05 ppm s 1H indene proton, δ 7.03 to 7.85 ppm m 10H aromatic. MS (EI) m/z 5, 22, 6 isotopic pattern corresponding to natural distribution.

EA CH-combustion analysis: calculated 64.35% C4, 63% H; Found: 64.08/63.89% 4.53/4.63%.

Polymerization Example

All the polymerizations were carried out in 300 mL of toluene under the conditions indicated in Table 1.

The NMR data were measured by means of a Bruker AMX 500 device and evaluated on the basis of literature data.

TABLE 1

| Run No. | Catalyst | Amount # | Tp [° C.] | C3 [mol-1] | Yield [g] | tp [min] | Activity* | Tg [° C.] | Tm [° C.] | Mw | Mw/Mn |
|---|---|---|---|---|---|---|---|---|---|---|---|
| P 36 | Flu-Et-lInd | 7.5 | 30 | 2.9 | 36.87 | 33 | 3080 | −5.9 | 50.2 | 171.000 | 1.96 |
| P 45 | Flu-Et-lInd | 10 | 35 | 4.92 | 115.23 | 39 | 3603 | −7.5 | 51.7 | 95.700 | 1.74 |

| Run No. | Pentaden in % | mmmm | mmmr | rmmr | mmrr | mmrm = rmrr | rmrm | rrrr | rrrm | mrrm | Al/Zr |
|---|---|---|---|---|---|---|---|---|---|---|---|
| P 36 | | 36.7 | 18.5 | 2.1 | 21.1 | 5.0 | 0.0 | 2.5 | 3.7 | 10.3 | 2000 |
| P 45 | | 36.5 | 17.9 | 1.7 | 21.0 | 5.8 | 0.3 | 3.1 | 3.6 | 10.1 | 2000 |
| | # in μmol | | | *kg PP/mol[Zr]mol[C3]h | | | | | | | |

What is claimed is:

1. Linear, isotactic polymer which has:
   (a) a structure of one or several C₂ to C₂₀ olefins,
   (b) an isotacticity, due to a statistic distribution of stereoscopic errors in the polymer chain, within the range of from 25 to 60% of [mmmm] pentad concentration,
   (c) a mean weight value molecular weight (M_w) within the range of from 100,000 to 800,000 g/mol,
   (d) a T_g value of from −50 to +30° C.,
   (e) a [rmrm] pentad concentration amounting to a maximum of 2.5% of the entire pentad area, and
   (f) [rrrr] and [mrrr] pentad concentrations that are each greater than the concentration of the [rmrm] pentad.

2. Linear, isotactic polymer according to claim 1, wherein the polymer is a thermoplastic elastomer.

3. Linear, isotactic polymer according to claim 1, wherein the olefin is a C₃ to C₂₀ alk-1-ene.

4. Linear, isotactic polymer according to claim 3, wherein the alk-1-ene is selected from the group consisting of propene, 1-butene, 2-butene, 1-pentene, 1-hexene, 1-octene, 1-nonene, 1-decene, 1-dodecene, 1-hexadecene, 1-octadecene, and 1-eicosene.

5. Linear, isotactic polymer according to claim 1, wherein the olefin is a C₅ to C₂₀ cycloolefin.

6. Linear, isotactic polymer according to claim 5, wherein the cycloolefin is selected from the group consisting of cyclopentene, cyclohexene, norbornene, and derivatives thereof.

7. Linear, isotactic polymer according to claim 1, wherein the polymer is polypropylene.

8. Linear, isotactic polymer according to claim 1, wherein the polymer is a copolymer having a structure of propylene and a $C_4$–$C_{20}$ olefin and/or cycloolefin.

9. Linear, isotactic polymer according to claim 1, wherein the polymer is a terpolymer having a'structure of propylene, $C_2$–$C_{20}$ olefin and cycloolefin.

10. An article selected from the group consisting of fibers, sheets, moulded bodies, and impact resistant plastic materials comprising a linear, isotactic polymer according to claim 1.

11. Linear, isotactic polymer according to claim 1, wherein the mean weight value molecular weight ($M_w$) is 120,000 to 300,000 g/mol.

12. Linear, isotactic polymer according to claim 1, wherein the $T_g$ value is −20 to +10° C.

13. Linear, isotactic polymer according to claim 1, wherein the polymer has a molecular weight distribution (Mw/Mn) of 1.2 to 3.5.

* * * * *